March 17, 1942.   P. BARKER   2,276,642
AIRPLANE
Filed Aug. 2, 1939   2 Sheets-Sheet 1
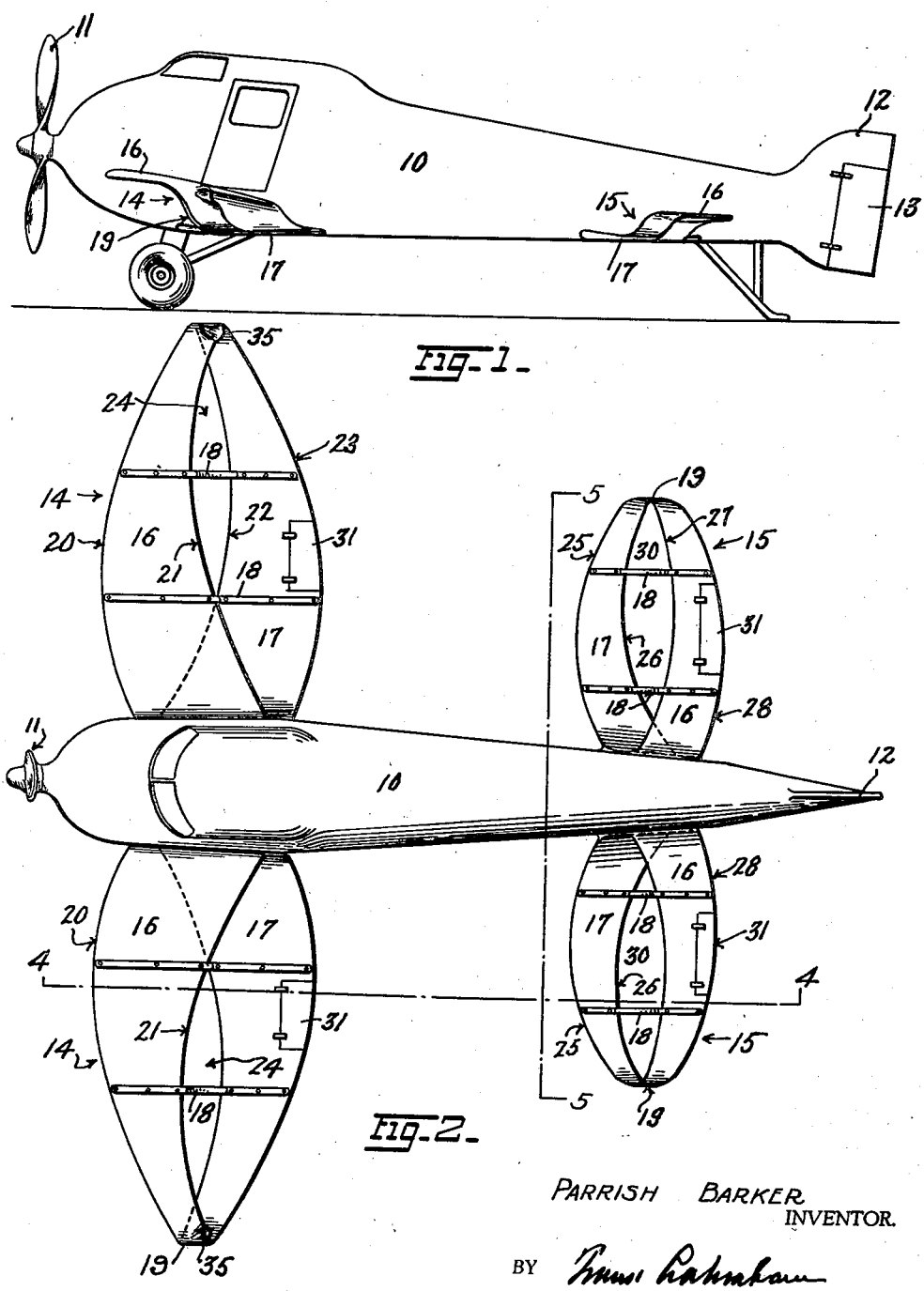
PARRISH BARKER
INVENTOR.
BY
ATTORNEY.

March 17, 1942.　　　P. BARKER　　　2,276,642
AIRPLANE
Filed Aug. 2, 1939　　　2 Sheets-Sheet 2

PARRISH BARKER
INVENTOR.
BY
ATTORNEY.

Patented Mar. 17, 1942

2,276,642

UNITED STATES PATENT OFFICE 2,276,642

AIRPLANE

Parrish Barker, Temple City, Calif.

Application August 2, 1939, Serial No. 287,975

2 Claims. (Cl. 244—34)

The present invention relates to airplanes and more particularly the arrangement and construction of wings and tail structures. Airplanes in common use are of the monoplane or biplane type, the wings of the latter type being spaced apart a substantial distance. In both types just mentioned a number of different kinds of auxiliary devices are used for guiding the plane in its flight and for keeping the plane during flight on an even keel.

It is an object of the present invention to so construct the wings and arrange the wings that the tendency of the plane to tip, nose dive or spin is materially reduced. To obtain this object the wings are made with two aerofoils closely associated one above another and preferably joined at the tips in a continuous curving leading and trailing edge from one aerofoil to the other, or as two separate aerofoils but in either instance the aerofoils are curved on their leading and trailing edges reversely to each other for a considerable portion of the distance from the fuselage to the wing tips.

Other objects and advantages will appear hereinafter from the following description and drawings. Referring to the drawings which are for illustrative purposes only—

Fig. 1 is a side elevation of an airplane having a wing construction embodying a form of my invention;

Fig. 2 is a plan view of the airplane shown in Fig. 1;

Figure 3:
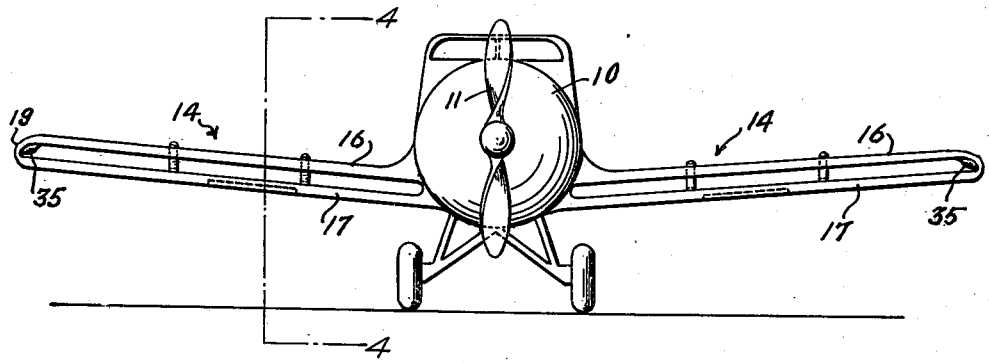
Fig. 3 is a front view of the airplane shown in Figs. 1 and 2.
Figure 4:
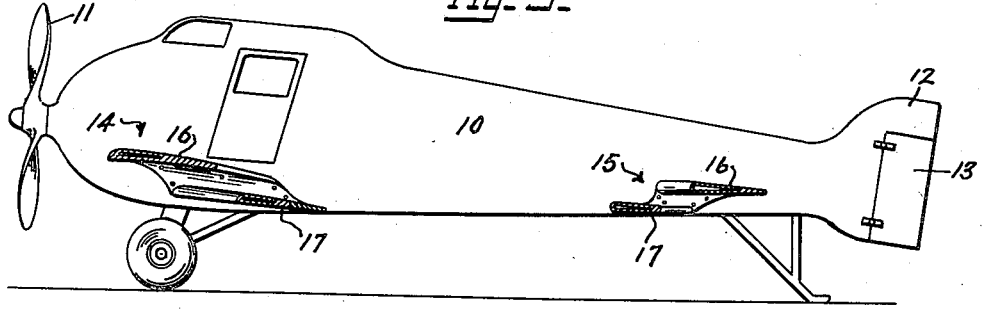
Fig. 4 is a view similar to Fig. 1, the wings being in section as on line 4—4 of Fig. 2.
Figure 5:
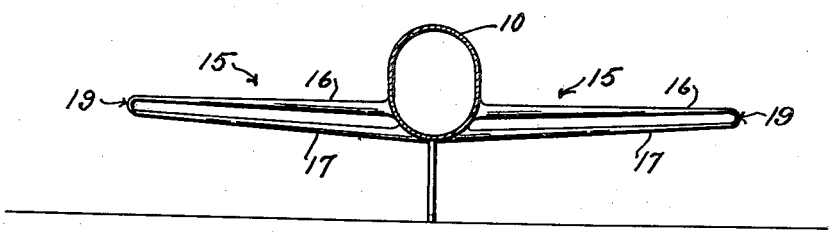
Fig. 5 is a sectional view taken on line 5—5 of Fig. 2.

Referring more particularly to the drawings, 10 designates the fuselage, 11 the propeller and 12 the tail in which is mounted a rudder 13.

In the form shown two forward wings 14 are provided and smaller wings 15 arranged at or near the tail of the airplane and forming a part thereof. The wings are attached at their inner ends to the fuselage in any common manner and each comprises an upper aerofoil 16 and lower aerofoil 17 spaced apart and braced by means of struts 18, the outer ends of the aerofoils being joined in any suitable manner as indicated at 19.

The aerofoils of each wing are arranged one above the other in close relationship as for instance approximately eighteen inches apart although this distance may be varied more or less according to the size of the plane and the length and breadth and the thickness of the wings, that is, the curvature of the aerofoils hereinafter more particularly described. In the forward wings 14 the upper aerofoil is provided with a forwardly longitudinally curved leading edge 20 and a similarly forwardly curved trailing edge 21. The lower aerofoil of the wings 14 is provided with a rearwardly longitudinally curved leading edge 22 and a similarly rearwardly curved trailing edge 23. The curvatures of the edges of the aerofoils is such that when viewed in plan as shown in Fig. 2 a space indicated at 24 is left open between the trailing edge 21 of the upper aerofoil 16 and the forward edge 22 of the lower aerofoil 17. This open space may be made larger or smaller or may be closed entirely according to the needs required, load to be carried and other factors, by making a broader wing surface. By this arrangement a major portion of the lower aerofoil is exposed to the air forces operating upon the aerofoil, the actual line of the centers of pressure on the lower aerofoil being substantially uninterrupted by the upper aerofoil. As shown at 19 the aerofoils of each wing are joined at their outer ends, lending to stability and rigidity. The rear wings 15 are curved the reverse of the forward wings 14, that is, the leading edge 25 and the trailing edge 26 of the lower aerofoil 17 are curved forwardly and the leading edge 27 and trailing edge 28 of the upper aerofoil 16 are curved rearwardly leaving a space indicated at 30 when observed in plan as shown in Fig. 2. With this arrangement any tendency to nose dive is decreased by reason of the fact that as the tail of the ship moves upwardly in relation to the nose of the ship the upper faces of both the upper aerofoil 16 and lower aerofoil 17 of each of the rear wings is fully exposed to air pressure and being located on the tail surface of the plane but slight resistance is necessary to right the airplane.

It is to be understood that ailerons as diagrammatically indicated at 31 may be used on any of the aerofoils as may be deemed desirable for the finer control of the airplane but I have found that by arranging the double aerofoil construction of the wings as above described with the connecting face or surface between the wing tips that the tendency of the airplane to be affected by changes of air currents is greatly reduced and the airplane rides substantially on even keel greatly reducing the "banking" on the turns as evidenced by airplanes now in use.

At 35 on the trailing edge of each aerofoil near the tip of the wing the edge is bent downwardly and inwardly forming a rounded or wedge shaped vane or cup of semi-frustro conical shape the effect of which on the under side of the aerofoil would tend to compress and direct the air stream inwardly, and on the upper side of the upper aerofoil would be to form a vacuum pocket above and to the rear of the upper wing tip. The wing tip being susceptible by reason of air pressure to movement away from equilibrium the drag caused by the air pressure on the vane under the aerofoil and the consequent vacuum above the aerofoil tends to lift the wing tips and keep the plane on even keel. This effect is even more pronounced when turning to the right or left from the straight ahead flight, because should it be desired to turn the plane laterally from its course, the vane or side surface of the connecting walls on the aerofoils at the trailing or inside wing of the turn, which under ordinarily circumstances has a tendency to lower, would present greater side surface to the air stream than the vane on the opposite or outside wing when turning and act as a drag. Such added resistance would hold the inside wing in a more nearly horizontal position keeping the plane on a more even keel. This action is also materially accentuated and aided by the resistance offered by the inside of the rearwardly and downwardly curving joining face between the tips of aerofoils which act in the same relationship to the air resistance when the plane is turning as do the vanes as aforementioned.

While I have shown my new wing as applied to a monoplane type of plane it is to be understood that it may be used on planes of the biplane type or in any place on any kind of plane where such a wing is adaptable for use in controlling or stabilizing the plane.

What I claim is:

1. In aerofoil means adapted to be mounted on and extend laterally of the fuselage of an airplane, a continuous dual wing at each side of the fuselage, each wing comprising an upper aerofoil section having a convexly curved leading edge and a concavely curved trailing edge, a lower aerofoil section substantially parallel to the upper section having a concavely curved leading edge and a convexly curved trailing edge, said upper sections being superposed to said lower sections at the inner and outer end portions only and being so disposed with relation to said lower sections that the upper section on one side of the fuselage cooperates with the lower section on the opposite side to form a substantially S-like form in plan from wing tip to wing tip and the upper section on the other side cooperates with the lower section on the opposite side thereto to form a substantially reverse S-like form in plan from wing tip to wing tip, said upper and lower sections of said wings decreasing in width from the fuselage outwardly and being joined at their outer ends by a connecting section, said upper and lower sections being in planes spaced apart a distance less than the average width of an individual aerofoil section.

2. In combination with the fuselage of an airplane, a continuous dual main wing at each side of the fuselage intermediate the ends thereof, each wing comprising an upper aerofoil section having a convexly curved leading edge and a concavely curved trailing edge, a lower aerofoil section substantially parallel to the upper section having a concavely curved leading edge and a convexly curved trailing edge, said upper sections being superposed to said lower sections at the inner and outer end portions only and being so disposed with relation to said lower sections that the upper section on one side of the fuselage cooperates with the lower section on the opposite side to form a substantially S-like form in plan from wing tip to wing tip and the upper section on the other side cooperates with the lower section on the opposite side thereto to form a substantially reverse S-like form in plan from wing tip to wing tip, said upper and lower sections on said wings decreasing in width from the fuselage outwardly and being joined at their outer ends by a connecting section, said upper and lower sections being spaced apart a distance less than the average width of an individual aerofoil section; and a stabilizer mounted adjacent the tail end of the fuselage comprising a continuous dual wing at each side of the fuselage having the same form and construction on a smaller scale as said main wings except that the leading and trailing edges of the upper sections of the stabilizer wings are reversely curved to the corresponding edges of the upper sections of the main wing and except that the leading and trailing edges of the lower sections of the stabilizer wing are reversely curved with respect to the corresponding edges of the lower sections of the main wing.

PARRISH BARKER.